United States Patent [19]

Hochbaum

[11] 3,927,848

[45] Dec. 23, 1975

[54] RECORDING AND/OR PLAYBACK APPARATUS

[75] Inventor: Istvan Hochbaum, Vienna, Austria

[73] Assignee: U.S. Philips Corporation, New York, N.Y.

[22] Filed: Aug. 1, 1973

[21] Appl. No.: 384,686

[30] Foreign Application Priority Data

Aug. 30, 1972 Germany ............................ 7232077

[52] U.S. Cl. .................................. 242/198; 360/93

[51] Int. Cl.$^{2}$ .................... G03B 1/04; G11B 15/32; G11B 23/04

[58] Field of Search ...... 242/198, 199, 200; 360/93, 360/90

[56] References Cited

UNITED STATES PATENTS 3,692,257 9/1972 Righi .................................. 242/198

*Primary Examiner*—Leonard D. Christian

*Attorney, Agent, or Firm*—Frank R. Trifari; David R. Treacy

[57] ABSTRACT

A recording and/or playback apparatus having a cassette holder pivotable between a loading position and an operating position. The cassette holder has a grip for tilting the holder. A shifting device connected to the cassette holder withdraws a free end of a winding spindle from the cassette holder as the holder is tilted into the loading position.

4 Claims, 2 Drawing Figures

RECORDING AND/OR PLAYBACK APPARATUS

The invention relates to a recording and/or playback apparatus comprising a cassette holder which is pivotable between a loading and an operating position. In the loading position of the holder a cassette can be inserted which has at least one winding hub for a record carrier in the form of a tape. The apparatus further comprises a winding spindle adapted to co-operate with the winding hub, at least the free end of the spindle being axially movable, said free end extending into the cassette holder in the operating position of said holder and being withdrawn from the cassette holder in the loading position of said holder. Such provisions are necessary to ensure that the cassette can freely be inserted into and removed from the cassette holder. In a known apparatus of the above mentioned type an actuating knob is provided for tilting the cassette holder and for moving the free end of the winding spindle, by means of which members can be operated, which in their turn cooperate with the cassette holder on the one hand and with the free end of the winding spindle on the other hand. Such a device has a fairly complicated construction and occupies much space, so that such a device will present difficulties, especially in the case of small apparatus intended to be mounted in a car.

It is an object of the invention to provide a simple and compact construction for tilting the cassette holder and for moving the free end of the winding spindle. According to the invention the cassette holder is designed, in a manner known per se, with a projecting grip for tilting it between the loading and the operating position, and a shifting device is connected to the cassette holder, which device for moving the free end of the winding spindle is coupled thereto. Such a shifting device may for example consist of a single rod system acting between the cassette holder and the free end of the winding spindle. When manually positioning the cassette holder, this ensures that the free end of the winding spindle is also positioned accordingly.

It has proved to be particularly advantageous and simple that the shifting device comprise a lever which is pivotally supported on the apparatus, said lever being hinged to the cassette holder by means of a connecting member and said lever further in its turn cooperating with the free end of the winding spindle. With such a construction it is further advantageous that a leaf spring is provided on the lever, the spring as viewed from the lever having a projecting, fork-shaped end, which engages the free end of the winding spindle, thus permitting the end positions of the two movable parts of the apparatus to be defined independently of each other.

The invention will now be described in more detail, with reference to the drawing, which schematically represents an embodiment of the invention, to which embodiment, however, the scope of the invention is not limited.

Figure 1:
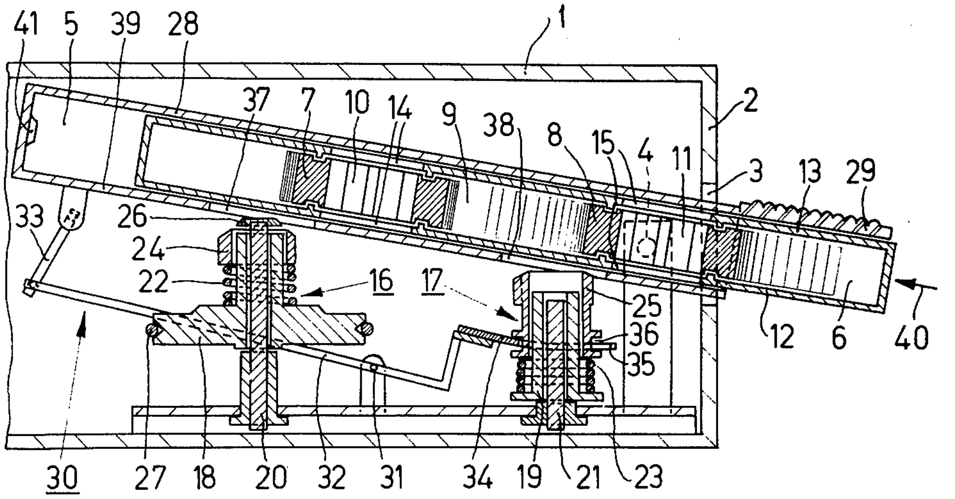
FIG. 1 is a side, sectional view of an apparatus with a shifting device constituted by a lever, the cassette holder being in the loading position.
Figure 2:
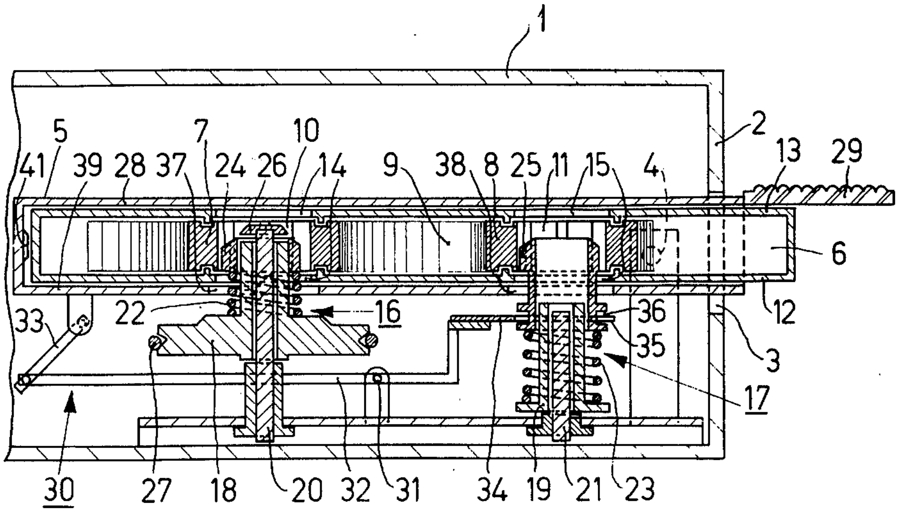
FIG. 2 is a side, sectional view of the same apparatus with the cassette holder in the operating position.

In FIGS. 1 and 2 the reference numeral 1 designates an apparatus housing, which has a slot-shaped opening 3 at the narrow side 2. In the apparatus a box-shaped cassette holder 5 is pivotable about the shaft 4 between a loading and an operating position. The open end of the cassette-holder protrudes from the opening 3 of the apparatus housing and serves for inserting a cassette 6 into the cassette holder. In the cassette two adjacent winding hubs 7 and 8 are accommodated, between which a record carrier 9 extends. The two windings hubs have openings 10 and 11, each for one winding spindle and corresponding openings 14 and 15 are provided in the cassette walls 12 and 13. The two winding spindles are located in the apparatus and are designated 16 and 17; they each comprise a basic member 18 and 19 respectively, which is pivotable about a shaft 20 and 21 respectively which is rigidly connected to the apparatus. On the basic members the actual carriers for the winding hubs 7 and 8, constituted by the free ends 24 and 25 of the respective winding spindles, are movable against the action of a spring 22 and 23 respectively. The movability of the free end 24 of the winding spindle 16 owing to the action of the spring 22 is limited by a protrusion 26 on the shaft 20. The winding spindle 16 serves for driving the record carrier; for this purpose, the basic member 18 is driven by means of a belt 27. If desired, it may also be driven by means of a friction clutch. To obtain a suitable counterforce, the basic member 19 of the other winding spindle 17 may for example be braked by means of a belt brake, not shown. However, there may also be provided a drive system for the winding spindle 17 so as to permit the record carrier to be driven for rewinding purposes.

The cassette holder itself forms a handle for tilting it between the loading and operating position, for which purpose the major surface 28 which faces away from the winding spindles is provided with a projection 29 which protrudes from the opening 3 of the apparatus housing and which extends beyond the open end of the cassette holder. Further, a shifting device 30 is connected to the cassette holder, which serves for moving the free end 25 of the winding spindle 17. For this purpose, the shifting device comprises a lever 32, which is pivotable about a shaft 31 which is rigidly connected to the apparatus, one end of said lever being pivotable to the cassette holder by means of a connecting member 33 and the other end cooperating with the free end 25 of the winding spindle 17 by means of a leaf spring 34 which is mounted on said lever. The leaf spring 34 has a fork-shaped end 35 which, viewed from the lever 32, projects forwards and engages an annular groove 36 provided at the free end 25 of the winding spindle 17. Thus, the free end 25 of the winding spindle 17 can be rotated freely, but is taken along and is axially moved by the fork-shaped end 35 of the leaf spring 34 when this spring is moved, the instantaneous position being defined by the resultant of the leaf spring 34 and the spring 23.

FIG. 1 shows the cassette holder in the loading position. The cassette holder is then in such a position that the major surface 39, which faces the winding spindles and which comprises openings 37 and 38 for the passage of said spindles, is located above the free end 24 of the winding spindle 16. Furthermore in this position of the cassette holder the lever 22 is moved to such a position by means of the connecting member 33, that the leaf spring 34 exerts its greatest pressure on the free end of the winding spindle 18 in a direction in which the action of the spring 23, is opposed, so that this end is moved so far away from the cassette holder in the axial direction, that it is located outside the cassette holder, i.e., underneath the major surface 39 thereof.

Thus, the entire spaces within the cassette holder is freely accessible in the loading position.

When, as is schematically shown in FIG. 1, a cassette is manually inserted in the cassette holder in the direction of the arrow 40, and the cassette is in a fixed position relative to the winding spindle as for example defined by a stop 41 provided in the cassette holder, the cassette suitably protruding somewhat from the opening 3 of the apparatus housing, the cassette holder can be tilted into the operating position shown in FIG. 2 by exerting with the hand with which the cassette is inserted a pressure in an anti-clockwise direction on the cassette and/or the projection 29 which takes the form of a grip. As the cassette holder is thus tilted, the free end 24 of the winding spindle 16 will penetrate into the cassette holder. Furthermore, as the cassette holder is tilted the lever 32 is moved by means of the shifting member 33, so that the leaf spring 34 moves the free end 35 of the winding spindle 17 in the direction of the cassette holder, causing this free end to penetrate also into the cassette holder. The free ends 24 and 25 of the winding spindles 16 and 17 then engage the openings 10 and 11 of the winding hubs 7 and 8 accommodated in the cassette, thus providing a positive coupling between the winding spindles and the winding hubs.

To return the cassette holder from the operating position into the loading position manual pressure is exerted on the protrusion 29 of the cassette holder, which serves as a grip, in clockwise direction. As the cassette holder is subsequently tilted away, the cassette holder disengages from the free end 24 of the winding spindle 16 and the free end 25 of the winding spindle 17 is withdrawn from the cassette holder by means of the shifting device 30. In the loading position of the cassette holder a cassette contained in the holder is then disengaged from the winding spindles and slips out of the cassette holder by the action of gravity or can be removed from the holder by hand; it is obvious that an automatic rejection device may also be provided. In this respect it is to be noted that suitable interlocking devices may be provided for the cassette holder, which permit the cassette holder to be moved from one position into the other only, when the cassette holder contains a correctly inserted cassette or when other apparatus functions are selected.

As can be seen, the winding spindles and winding huts are made to engage with one another or disengaged from each other by merely tilting the cassette holder, which is formed with a projecting grip, thus ensuring the unimpeded insertion of a cassette into or removal from the cassette holder.

If desired, the shifting device may also cooperate with the free ends of the two winding spindles.

What is claimed is:

1. A recording and/or playback apparatus for use with a cassette having at least one winding hub for a record carrier in the form of a tape, said apparatus comprising a cassette holder pivotably mounted in said apparatus for rotation between a loading and an operating position; a winding spindle having at least an end axially movable from an engaging position for engaging the hub of a cassette inserted in said holder, said holder being in the operating position, to a withdrawn position for being withdrawn from engagement with a cassette being inserted or removed from said holder, said holder being in the loading position; and means operable in direct response to movement of said holder for moving said spindle end between said positions.

2. An apparatus as claimed in claim 1 wherein said holder comprises a portion projecting from said apparatus for manual movement of said holder from said operating to said loading positions.

3. An apparatus as claimed in claim 1, additionally comprising a pivot mounting, wherein said means for moving comprises a lever pivotal about said pivot mounting, a first end of said lever comprising means for engaging said spindle for moving said spindle end from the engaging to the withdrawn position, and a member engaging a second end of said lever and said holder for moving said second end of said lever in response to movement of said holder from the operating to the loading position.

4. An apparatus as claimed in claim 3, wherein said holder comprises a portion projecting from said apparatus for manual movement of said holder from said operating to said loading position, and said engaging means comprises a bifurcated leaf spring disposed to engage a free end of the winding spindle.

* * * * *